US012526541B2

(12) United States Patent
Ki et al.

(10) Patent No.: US 12,526,541 B2
(45) Date of Patent: Jan. 13, 2026

(54) METHOD AND APPARATUS WITH HIGH-RESOLUTION IMAGE ZOOMING

(71) Applicant: Samsung Electronics Co., Ltd., Suwon-si (KR)

(72) Inventors: Sehwan Ki, Suwon-si (KR); Younghyun Jo, Suwon-si (KR); Eunhee Kang, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 18/350,240

(22) Filed: Jul. 11, 2023

(65) Prior Publication Data

US 2024/0223917 A1 Jul. 4, 2024

(30) Foreign Application Priority Data

Dec. 28, 2022 (KR) ........................ 10-2022-0186986

(51) Int. Cl.
*H04N 25/46* (2023.01)
*G06T 3/4046* (2024.01)
(Continued)

(52) U.S. Cl.
CPC ........... *H04N 25/46* (2023.01); *G06T 3/4046* (2013.01); *G06T 3/4053* (2013.01); *H04N 9/78* (2013.01);
(Continued)

(58) Field of Classification Search
CPC .......... H04N 25/46; H04N 9/78; H04N 23/69; H04N 23/85; H04N 25/10; H04N 23/843;
(Continued)

(56) References Cited

U.S. PATENT DOCUMENTS 8,233,747 B2 7/2012 Ali et al.
9,325,905 B2 4/2016 Noyes
(Continued)

FOREIGN PATENT DOCUMENTS

| KR | 10-1320818 B1 | 10/2013 |
| KR | 10-2019-0040416 A | 4/2019 |
| KR | 10-2021-0116168 A | 9/2021 |

OTHER PUBLICATIONS

Xu et al. "Towards Real Scene Super-Resolution with Raw Images" *Proceedings of the IEEE/CVF Conference on Computer Vision and Pattern Recognition.* 2019 (pp. 1723-1731).
(Continued)

*Primary Examiner* — Gevell V Selby
(74) *Attorney, Agent, or Firm* — NSIP Law

(57) ABSTRACT

A method and apparatus for generating a high-resolution digital zoom image may obtain a raw image captured by an image sensor from the image sensor, obtain an RGB image corresponding to the raw image, separate a luminance component and a chrominance component from the RGB image, extract a first feature of the RGB image, of which color information is enhanced, by applying the chrominance component to a first neural network, extract a second feature of the RGB image, of which texture information is enhanced, by applying the raw image and the luminance component to a second neural network, and generate the high-resolution digital zoom image, which corresponds to the RGB image, by upscaling the color information and the texture information based on the first feature or the second feature.

20 Claims, 16 Drawing Sheets

(51) Int. Cl.
  *G06T 3/4053* (2024.01)
  *H04N 9/78* (2006.01)
  *H04N 23/69* (2023.01)
  *H04N 23/85* (2023.01)
  *H04N 25/10* (2023.01)

(52) U.S. Cl.
  CPC .............. *H04N 23/69* (2023.01); *H04N 23/85* (2023.01); *H04N 25/10* (2023.01)

(58) Field of Classification Search
  CPC .... H04N 23/10; H04N 25/134; G06T 3/4046; G06T 3/4053; G06T 3/4015; G06V 10/82; G06N 3/045
  See application file for complete search history.

(56) References Cited

U.S. PATENT DOCUMENTS

| | | | |
|---|---|---|---|
| 2009/0160968 A1* | 6/2009 | Prentice | H04N 23/667 348/222.1 |
| 2019/0156459 A1* | 5/2019 | Chen | G06T 3/4053 |
| 2021/0168263 A1* | 6/2021 | Zhu | H04N 1/603 |
| 2022/0247889 A1* | 8/2022 | Babiloni | H04N 9/646 |
| 2023/0014272 A1* | 1/2023 | Shao | H04N 23/951 |

OTHER PUBLICATIONS

Liang et al. "SwinIR: Image Restoration Using Swin Transformer" *Proceedings of the IEEE/CVF international conference on computer vision.* 2021 (pp. 1833-1844).

Xu et al. "Exploiting Raw Images for Real-Scene Super-Resolution" *IEEE transactions on pattern analysis and machine intelligence* vol. 44 Issue 4. Feb. 2, 2021 (pp. 1-16).

* cited by examiner

METHOD AND APPARATUS WITH HIGH-RESOLUTION IMAGE ZOOMING

CROSS-REFERENCE TO RELATED APPLICATIONS

This application claims the benefit under 35 USC § 119(a) of Korean Patent Application No. 10-2022-0186986, filed on Dec. 28, 2022, in the Korean Intellectual Property Office, the entire disclosure of which is incorporated herein by reference for all purposes.

BACKGROUND

1. Field

The following description relates to a method and apparatus high-resolution image zooming.

2. Description of Related Art

To increase the image quality of the images produced by a camera, the fineness of pixelation an image sensors is being improved, and the size of image data generated by image sensors increases as the resolution of image sensors increase. However, performing image signal processing (ISP) on all of the sensed data of an image from a high-fineness pixel sensor may require a large amount of computation. Accordingly, in general, ISP is sometimes performed by lowering the sensing resolution for sensing data of a high-fineness pixel sensor, which may be done through binning, which loses sensed image data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating a zoom image includes obtaining a raw image captured by an image sensor from the image sensor, obtaining an RGB image corresponding to the raw image, separating a luminance component and a chrominance component from the RGB image, extracting a first feature of the RGB image, of which color information is enhanced, by applying the chrominance component to a first neural network, extracting a second feature of the RGB image, of which texture information is enhanced, by applying the raw image and the luminance component to a second neural network, and generating the zoom image, which corresponds to the RGB image, by upscaling the color information and the texture information based on the first feature or the second feature.

The extracting of the second feature may include rearranging pixels of the raw image, concatenating the raw image having the rearranged pixels and original position information of the image sensor, corresponds to the rearranged pixels of the raw image, with the luminance component, and extracting the second feature by applying, to the second neural network, an image obtained by concatenating the raw image and the original position information with the luminance component.

The original position information of the image sensor may be obtained by concatenating x-axis position information of the image sensor and y-axis position information of the image sensor.

The original position information of the image sensor may be obtained by generating a position map by encoding x-axis position information of the image sensor and y-axis position information of the image sensor.

The original position information of the image sensor may be obtained by applying x-axis position information of the image sensor and y-axis position information of the image sensor to a neural network.

The rearranging of the pixels of the raw image may include rearranging the pixels of the raw image by four channels of green (G), red (R), blue (B), and green (G).

The obtaining of the RGB image may include performing binning on the raw image, and generating the RGB image through an image signal processing (ISP) of the raw image on which the binning has been performed.

The obtaining of the RGB image may include performing binning on the raw image, downsampling the raw image on which the binning has been performed, and generating the RGB image through ISP of the downsampled raw image.

The generating of the zoom image may include upscaling the color information using information obtained by performing a first fusion on the first feature and the second feature, upscaling the texture information according to the second feature, and generating the zoom image by performing a second fusion on the upscaled color information and the upscaled texture information.

The raw image may have a Bayer pattern, a tetra cell pattern, or a nona cell pattern.

The method may further include, in response to the raw image having the tetra cell pattern or the nona cell pattern, converting the raw image into the Bayer pattern by rearranging color filters of the raw image on a pixel-by-pixel basis.

The image sensor may include an ultra-fine pixel sensor, or an ultra-fine pixel camera having a fine pixel array.

In another general aspect, an electronic device includes an image sensor configured to capture a raw image, and a processor. The processor may be configured to obtain the raw image from the image sensor, obtain an RGB image corresponding to the raw image, separate a luminance component and a chrominance component from the RGB image, extract a first feature of the RGB image, of which color information is enhanced, by applying the chrominance component to a first neural network, extract a second feature of the RGB image, of which texture information is enhanced, by applying the raw image and the luminance component to a second neural network, and generate a zoom image corresponding to the RGB image by upscaling the color information and the texture information based on the first feature or the second feature.

The processor may be further configured to rearrange pixels of the raw image, concatenate the raw image with the rearranged pixels and original position information of the image sensor corresponding to the rearranged pixels of the raw image with the luminance component, and extract the second feature by applying, to the second neural network, an image obtained by concatenating the raw image and the original position information with the luminance component to the second neural network.

The original position information of the image sensor may be obtained by concatenating x-axis position information of the image sensor and y-axis position information of the image sensor based on a predetermined rule, generating a position map by encoding the x-axis position information of the image sensor and the y-axis position information of the image sensor, or applying, to a neural network, the x-axis position information of the image sensor and the y-axis position information of the image sensor.

The processor may be further configured to rearrange the pixels of the raw image by four channels of green (G), red (R), blue (B), and green (G).

The processor may be further configured to perform binning on the raw image, downsample the raw image on which the binning has been performed, and generate the RGB image through an ISP of the downsampled raw image.

The processor may be further configured to upscale the color information using information obtained by performing a first fusion on the first feature and the second feature, upscale the texture information by the second feature, and generate the zoom image by performing a second fusion on the upscaled color information and the upscaled texture information.

The electronic device may further include a display configured to display the zoom image, or a memory configured to store the high-resolution digital zoom image.

Other features and aspects will be apparent from the following detailed description, the drawings, and the claims.

Figure 1:
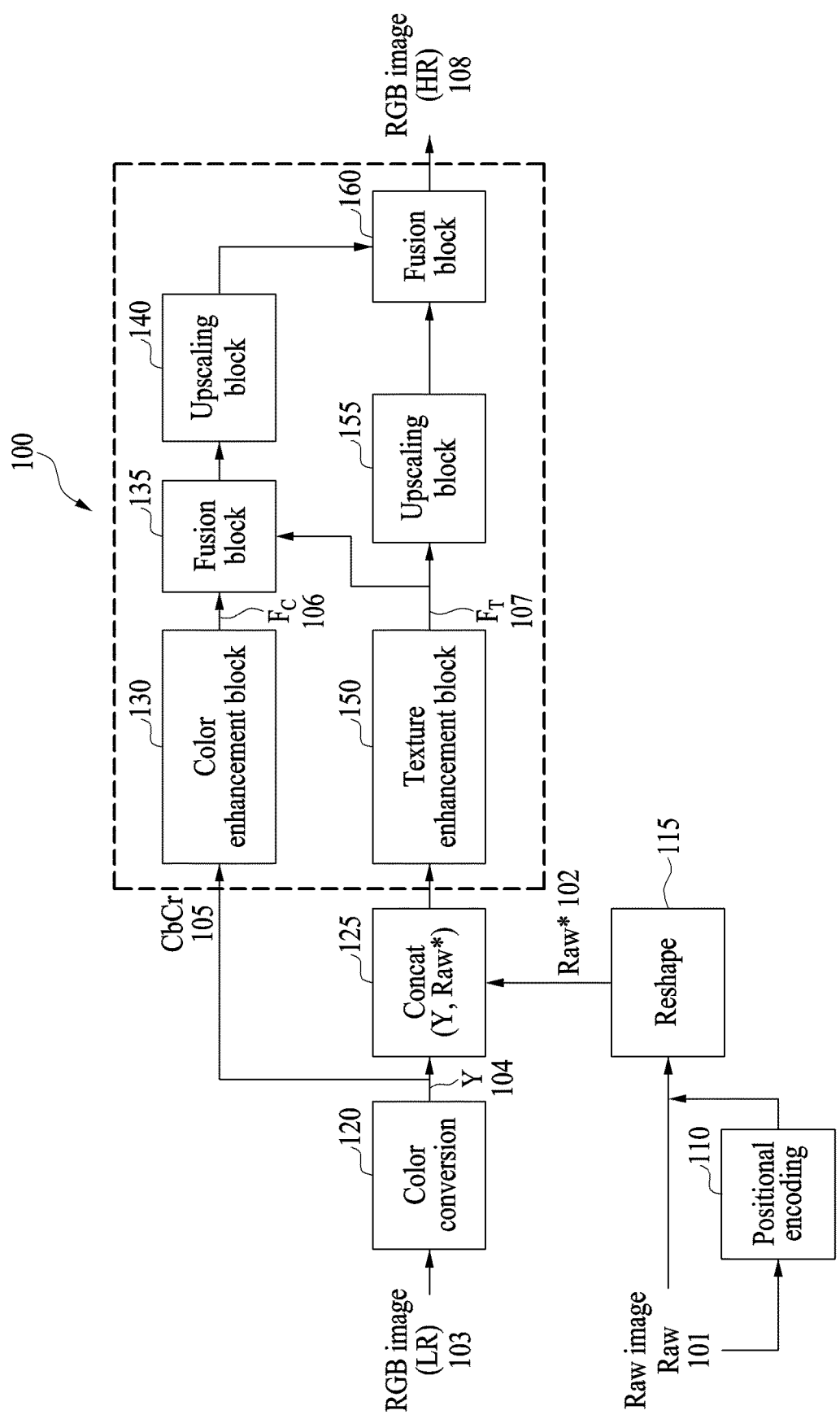
FIG. 1 illustrates an example method of generating a high-resolution digital zoom image, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first", "second", and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example method of generating a high-resolution digital zoom image, according to one or more embodiments. As the images and image-related data described herein are digital, the term "digital" may be assumed hereafter. Referring to FIG. 1, an electronic device (hereinafter referred to as "electronic device") 100 for generating a high-resolution zoom image may include a positional encoding block 110, a reshaping block 115, a color conversion block 120, a concatenation block 125, a color enhancement block 130, a first fusion block 135, a first upscaling block 140, a texture enhancement block 150, a second upscaling block 155, and a second fusion block 160. As used herein "high resolution" does not refer to any particular resolution, but rather refers to a relative resolution, i.e., a resolution greater than an input or initial image that is being zoomed.

In the example of FIG. 1, the above components of the electronic device 100 are illustrated as separately configured components to describe functions thereof by distinguishing the functions from one another. Accordingly, when a product is implemented, the electronic device 100 may include all the plurality of components or process a portion of the components in at least one processor.

The positional encoding block 110 may receive a raw image Raw 101. The raw image Raw 101 may correspond to, for example, raw data, of which information is not lost due to binning and image signal processing (ISP) that will be described below, as sensing data of, e.g., 108 megapixels (MP) captured by an image sensor. Hereinafter, the terms "raw image" and "raw data" may be used interchangeably. The raw image Raw 101 may have, for example, a Bayer pattern, a tetra cell pattern, or a nona cell pattern. Various patterns of the raw image Raw 101 is described with reference to FIGS. 2A to 2C.

The positional encoding block 110 may encode original position information of an image sensor that captures the raw image Raw 101, based on the raw image Raw 101.

The reshaping block 115 may generate a raw image Raw* 102 obtained by rearranging pixels of the raw image Raw 101 based on the raw image Raw 101 and/or the original position information of the image sensor encoded in the positional encoding block 110. The reshaping block 115 may rearrange positions of the pixels of the raw image Raw 101, for example, by four channels of green (G), red (R), blue (B), and green (G). The reshaping block 115 may generate the raw image Raw* 102 in which the positions of the pixels are rearranged by an unshuffle layer configured to change the positions of the pixels. To inform a neural network (e.g., a texture enhancement block 150) of which one of R, G, and B channels corresponds to the neural network due to different characteristics of color channels (R, G, and B channels) during image processing, the reshaping block 115 may rearrange the positions of the pixels. The reshaping block 115 may transmit the raw image Raw* 102 with the rearranged pixels to the concatenation block 125. An example of rearranging the pixels of the raw image Raw 101 by the electronic device 100 is described with reference to FIGS. 3A and 3B.

The color conversion block 120 may receive an RGB image 103 corresponding to the raw image Raw 101. Here, the RGB image 103 corresponding to the raw image Raw 101 may be an RGB image obtained by sequentially performing binning and ISP on the raw image Raw 101 to reduce an amount of subsequent computation to be performed on (and from) the RGB image 103. The RGB image 103 may be, for example, an RGB image obtained by performing binning and then ISP through an existing (e.g., commercial) zoom-in program. As described above, since the ISP is performed by reducing the resolution of the raw image Raw 101 in a binning process, the RGB image 103 may be a low-resolution image corresponding to the raw image Raw 101.

The electronic device 100 may divide the RGB image 103 into a luminance component Y 104 and a chrominance component Cb, Cr 105 and input the luminance component Y 104 and the chrominance component Cb, Cr 105 to a neural network (e.g., the color enhancement block 130 and the texture enhancement block 150). Components included in a box indicated by a dashed line in FIG. 1 may correspond to components that may be configured with a neural network.

The color conversion block 120 may separate the luminance component Y 104 and the chrominance component Cb, Cr 105 from the RGB image 103. The luminance component Y 104 may correspond to one piece of channel information Y of a luminance component. In addition, the chrominance component Cb, Cr 105 may correspond to two pieces of channel information Cb and Cr of a chrominance component. Hereinafter, the terms "luminance component" and "channel information of a luminance component" may be used interchangeably. In addition, the terms "chrominance component" and "channel information of a chrominance component" may be used interchangeably.

In an example, in a zoom-in process, color information and texture information (or brightness information) may be enhanced by separating the luminance component Y 104 and the chrominance component Cb, Cr 105 and inputting the luminance component Y 104 and the chrominance component Cb, Cr 105 to each neural network, and a high-resolution zoom image (RGB image) may be generated through a process of mixing the enhanced color information and the enhanced texture information.

The color conversion block 120 may transfer the luminance component Y 104 to the concatenation block 125 and transfer the chrominance component Cb, Cr 105 to the color enhancement block 130.

The electronic device 100 may extract a first feature $F_C$ 106 of the RGB image with the enhanced color information, by applying the chrominance component Cb, Cr 105 to the color enhancement block 130.

The color enhancement block 130 may extract the first feature $F_C$ 106 of an image of which color information is enhanced by various schemes for color enhancement. The first feature $F_C$ 106 may correspond to a feature of the RGB image with the enhanced color information. The color enhancement block 130 may also be called a "first neural network". The color enhancement block 130 may correspond to, for example, a deep neural network (DNN) or a neural network having an encoder-decoder structure, but is not limited thereto. When the color enhancement block 130 has an encoder-decoder structure, an encoder may encode an input image to extract and use high-level context information. A decoder may transfer the high-level context information as a low-level pixel value during recovery of spatial information and restore an approximation of the original resolution. The color enhancement block 130 may transfer the first feature $F_C$ 106 to the first fusion block 135.

The concatenation block 125 may obtain an image by concatenating the luminance component Y 104 and the raw image Raw* 102 obtained by rearranging the pixels in the reshaping block 115; the thus-obtained image may be applied to the texture enhancement block 150.

The electronic device 100 may extract a second feature $F_T$ 107 from the image obtained by the concatenation block 125, using the texture enhancement block 150. The texture enhancement block 150 may extract the second feature $F_T$ 107 of an image of which texture information including a brightness, an edge, a line, and/or the like is enhanced by various known schemes for texture enhancement. The second feature $F_T$ 107 may correspond to a feature of the RGB image with the enhanced texture information including a luminance component. The texture enhancement block 150 may also be called a "second neural network".

The texture enhancement block 150 may also be a DNN or a neural network having an encoder-decoder structure, but is not limited thereto. The texture enhancement block 150 that processes a texture component may use a relatively deep network in comparison to the color enhancement block 130 that processes a chrominance component.

The color enhancement block 130 and the texture enhancement block 150 may be configured as separate neural networks, as shown in FIG. 1, or may be integrally configured as one neural network. An example of a structure of the color enhancement block 130 and/or the texture enhancement block 150 is described with reference to FIG. 4. In addition, the color enhancement block 130 and/or the texture enhancement block 150 may be trained through, for example, a training process described with reference to FIG. 12.

The texture enhancement block 150 may transmit the second feature $F_T$ 107 to the first fusion block 135 and the second upscaling block 155. The texture enhancement block 150 may provide the second feature $F_T$ 107 to the first fusion block 135 such that the second feature $F_T$ 107 associated with a texture may help to upscale a chrominance component from the color enhancement block 130.

The first fusion block 135 may perform a first fusion, which is a fusion of the first feature $F_C$ 106 and the second feature $F_T$ 107.

The first upscaling block 140 may upscale color information using information obtained by performing the first fusion on the first feature $F_C$ 106 and the second feature $F_T$ 107. The first upscaling block 140 may transmit the upscaled color information to the second fusion block 160.

When the second feature $F_T$ 107 is received from the texture enhancement block 150, the second upscaling block 155 may upscale texture information by the second feature $F_T$ 107. The second upscaling block 155 may transmit the upscaled texture information to the second fusion block 160.

The second fusion block 160 may perform a second fusion, which is a fusion of the upscaled color information and the upscaled texture information to generate a high-resolution zoom image.

In association with a luminance component, the electronic device 100 may obtain high-resolution texture information by upscaling texture information using information of a raw image (e.g., the raw image Raw* 102 obtained by rearranging the pixels of the raw image Raw 101) used as a reference image together with luminance information of the RGB image 103 that is an input image.

In association with a chrominance component, the electronic device 100 may obtain high-resolution color information by upscaling color information using a feature (e.g., the first feature $F_C$ 106) of color information of the input RGB image 103 together with a feature (e.g., the second feature $F_T$ 107) of a luminance component.

The electronic device 100 may generate a high-resolution RGB image 108 by concatenating high-resolution color information output from the first upscaling block 140 and high-resolution texture information output from the second upscaling block 155. Here, the high-resolution RGB image 108 may also be called a "high-resolution zoom image".

When an RGB image on which binning and ISP have been sequentially performed (to reduce an amount of computation) is zoomed-in, the electronic device 100 may utilize texture information of a high frequency included in the raw image 101 captured by the image sensor to enhance an image quality performance and to reduce the amount of computation during the ISP. In other words, the electronic device 100 may be used within the context of an ISP pipeline.

Figure 2A:
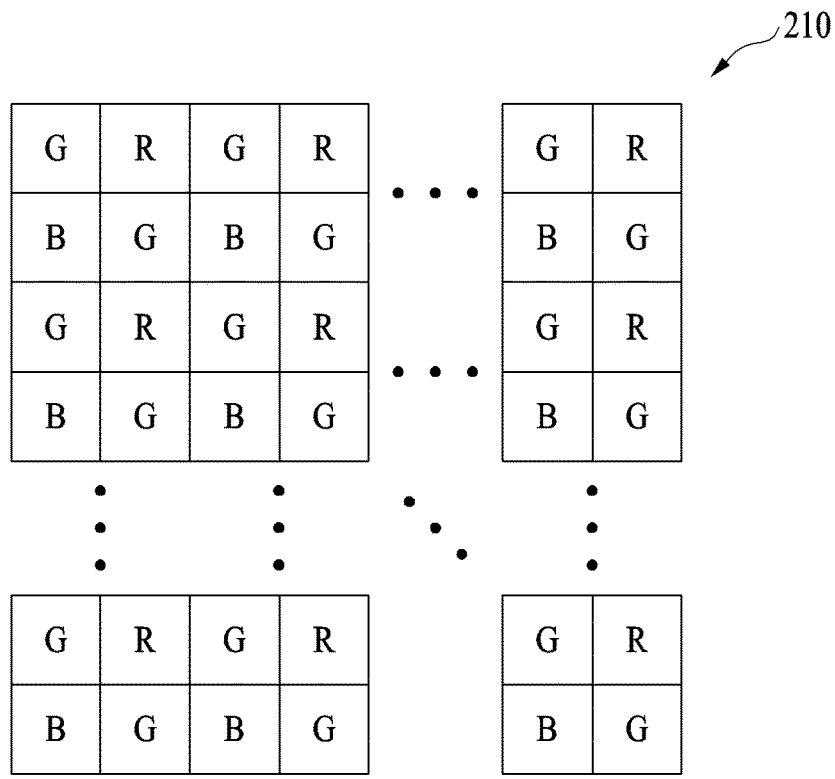
FIGS. 2A, 2B, and 2C illustrate examples of various patterns of a raw image, according to one or more embodiments.
Figure 2B:
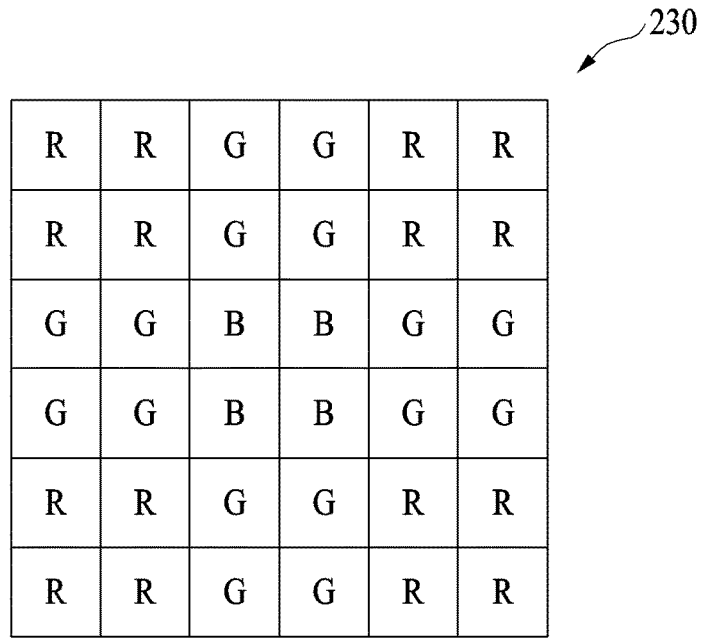
Figure 2C:
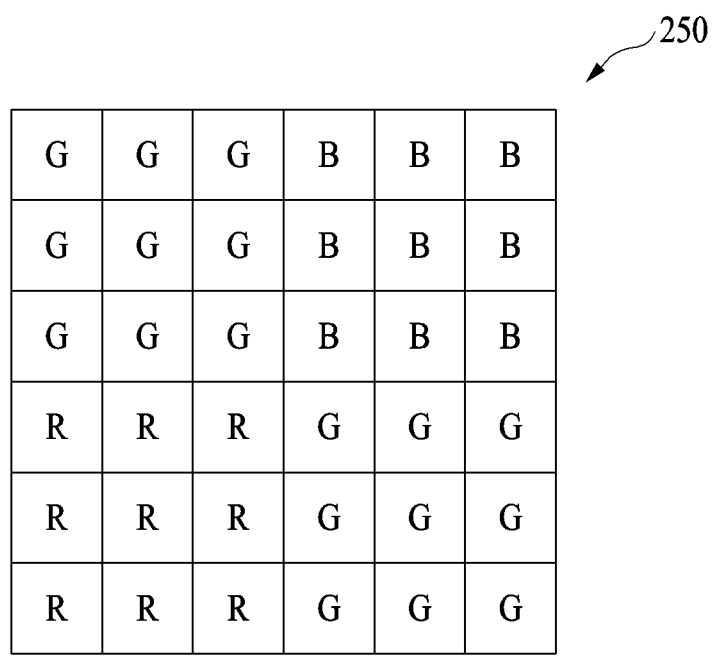

FIGS. 2A, 2B, and 2C illustrate examples of various patterns of a raw image, according to one or more embodiments.

Referring to FIG. 2A, a diagram 210 illustrates a Bayer pattern. In an image sensor, a red (R) filter, a green (G) filter, and a blue (B) filter may be arranged in a predetermined pattern on the same number of mono cells as a number of pixels. Here, the red (R) filter may be an optical filter that transmits only red, the green (G) filter may be an optical filter that transmits only green, and the blue (B) filter may be an optical filter that transmits only blue.

Since only the red (R) filter, the green (G) filter, or the blue (B) filter is combined with one sensor cell of the image sensor, one image pixel may sense red (R), green (G), or blue (B).

For example, in a traditional image sensor, such as a complementary metal oxide semiconductor (CMOS) sensor or a charge-coupled device (CCD) sensor, a red (R) filter, a green (G) filter, and a blue (B) filter may be arranged in a regular pattern. According to human visual characteristics, a green (G) filter, a red (R) filter and a blue (B) filter may be alternately arranged so that the green (G) filter is 50% and each of the red (R) filter and the blue (B) filter is 25%, in the image sensor, as shown in the diagram 210. As shown in the diagram 210, a pattern in which respective color filters are alternately arranged may also be referred to as a "Bayer pattern".

Referring to FIG. 2B, a diagram 230 illustrates a tetra cell pattern.

Unlike an RGB image sensor in which pixels having different color filters are arranged in a mosaic pattern as shown in the diagram 210, in the tetra cell pattern four pixels having the same color filter are arranged adjacent to each other to form a single group in the tetra cell image sensor as shown in the diagram 230. In an example, a tetra cell image sensor may capture a large amount of light in a dark place by combining four pixels of the same color and using the four pixels as one effective pixel to thus make use of a small amount of received light. In another example, the tetra-cell image sensor may capture a high-resolution image in a bright environment by rearranging pixels using an algorithm of remosaicing color filters, similar to the RGB image sensor. Since four pixels are grouped into one effective pixel, a resolution may also be reduced to ¼. As shown in the diagram 230, a pattern in which four adjacent pixels having the same color filter are grouped into one pixel may also be referred to as a "tetra cell pattern".

Referring to FIG. 2C, a diagram 250 illustrates a nona cell pattern.

In a nona cell image sensor, nine pixels having the same color filter may be arranged adjacent to each other to form one group (one effective same-color pixel), as shown in the diagram 250. The nona cell image sensor may capture a large amount of light in a dark place by combining nine pixels of the same color and using the nine pixels like one pixel. The nona cell image sensor may capture a high-resolution image in a bright environment by rearranging pixels using a remosaicing algorithm, similar to the RGB image sensor. Since the nine pixels are grouped into one effective pixel, a resolution may also be reduced to ⅑.

As shown in the diagram 250, a pattern in which nine adjacent pixels having the same color filter are grouped into one pixel may also be referred to as a "nona cell pattern".

Figure 3A:
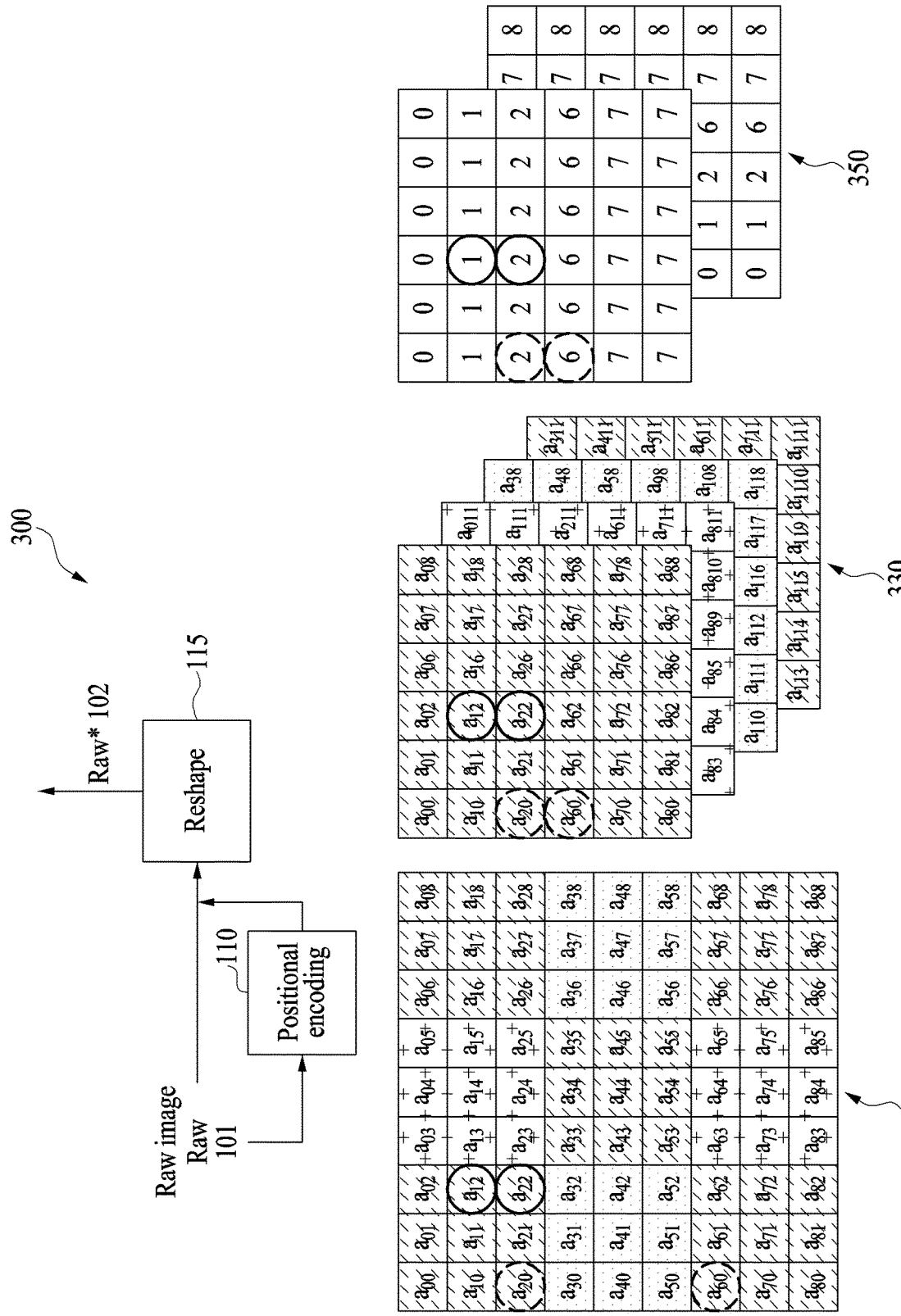
FIGS. 3A and 3B illustrate examples of rearranging pixels of a raw image, according to one or more embodiments.
Figure 3B:
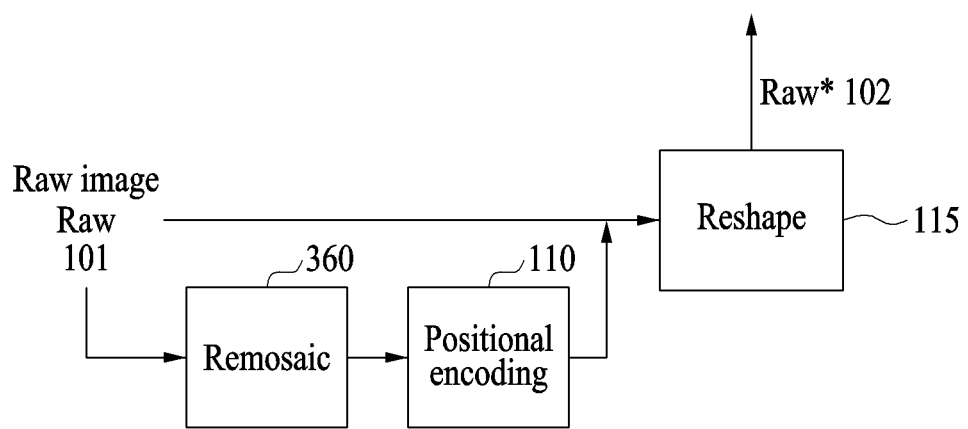

FIGS. 3A and 3B illustrate examples of rearranging pixels of a raw image, according to one or more embodiments. Referring to FIG. 3A, a diagram 300 illustrates (i) a color image 330 obtained by rearranging pixels of the raw image 101 having a nona cell pattern 310, and (ii) position information 350 corresponding to the nona cell pattern 310 of the raw image 101. Referring to FIG. 3B, a diagram 305 illustrates an example in which a remosaic block 360 to perform a remosaic process is added.

In this example, the position information 350 may correspond to original position information of an image sensor corresponding to pixels of the raw image 101, where the image sensor captured the pixels of the raw image 101. Obtaining of the position information 350 is described next.

The position information 350 may be encoded by the positional encoding block 110. In addition, pixels of the color image 330 may be rearranged by the reshaping block 115. The output of the positional encoding block 110 may be an encoding of the position information 350 that is inherent in the raw image 101.

For example, as shown in FIG. 3A, when the raw image 101 has been captured with the nona cell pattern 310, pixels a12 and a22 may correspond to pixels adjacent to each other and having the same color (e.g., green (G)) in the raw image 101. Pixels a20 and a60 may also correspond to pixels adjacent to each other and having the same color in the color image 330, in which with the pixels of the raw image 101 have been rearranged according to the nona cell pattern 310.

In this example, the position information 350 of the pixels a12 and a22 in the raw image 101 may correspond to y-axis coordinates 1 and 2, respectively, and may be pixels adjacent to each other in the raw image Raw 101. However, the position information 350 of the pixels a20 and a60 in the raw image Raw 101 may correspond to y-axis coordinates 2 and 6, respectively, which are spaced apart from each other in the raw image Raw 101.

As described above, when the raw image Raw 101 has the nona cell pattern 310 or a tetra cell pattern, original physical distances between pixels that are rearranged may be irregular and may increase, in comparison to the inter-pixel distances when the raw image Raw 101 has a Bayer pattern. When the raw image Raw 101 has the nona cell pattern 310 or the tetra cell pattern (instead of the Bayer pattern), a remosaicing process of converting the raw image into the Bayer pattern by rearranging color filters of the raw image on a pixel-by-pixel basis may be performed. The remosaicing process may be performed by the remosaic block 360 of FIG. 3B.

The remosaic block 360 may rearrange color filters of the raw image 101 having the nona cell pattern 310 or the tetra cell pattern on a pixel-by-pixel basis and may thus convert the raw image 101 into an image having the Bayer pattern. The positional encoding block 110 may encode position information in the Bayer pattern and transmit the encoded position information to the reshaping block 115, so that the reshaping block 115 may output the raw image Raw* 102 obtained by rearranging pixels based on the position information in the Bayer pattern.

For example, the position information 350 may be obtained by the positional encoding block 110 combining x-axis position information of an image sensor and y-axis position information of the image sensor based on a predetermined rule corresponding to the cell pattern, in the form of coordinates, e.g., (x, y) (the positional information of the sensor is received as a separate information). The position information 350 may be obtained by the positional encoding block 110 generating position maps in which the x-axis position information and the y-axis position information of the image sensor are respectively encoded. The position maps may be applicable to each of the channels of the color image 330. In addition, the position information 350 may be obtained by the positional encoding block 110 applying the x-axis position information and the y-axis position information of the image sensor to a neural network.

The reshaping block 115 may rearrange the pixels of the raw image Raw 101 by four channels of green (G), red (R), blue (B), and green (G), to generate the raw image Raw* 102 with the rearranged pixels.

In an example, in consideration of a difference in a physical distance between pixels for each possible pattern of the raw image 101 (that is, each possible pattern of the image sensor), the position information 350 may be encoded by the positional encoding block 110, and the pixels of the raw image 101 may be rearranged using the encoded position information 350 for training, and thus it may be possible to reduce both an amount of computation in ISP and an error (e.g., a remosaicing error) occurring in a process of rearranging the pixels. An electronic device may reduce remosaicing error by performing joint learning through a DNN. Joint learning may correspond to a training scheme of summing multiple losses to one value and using the value as a final loss.

Figure 4:
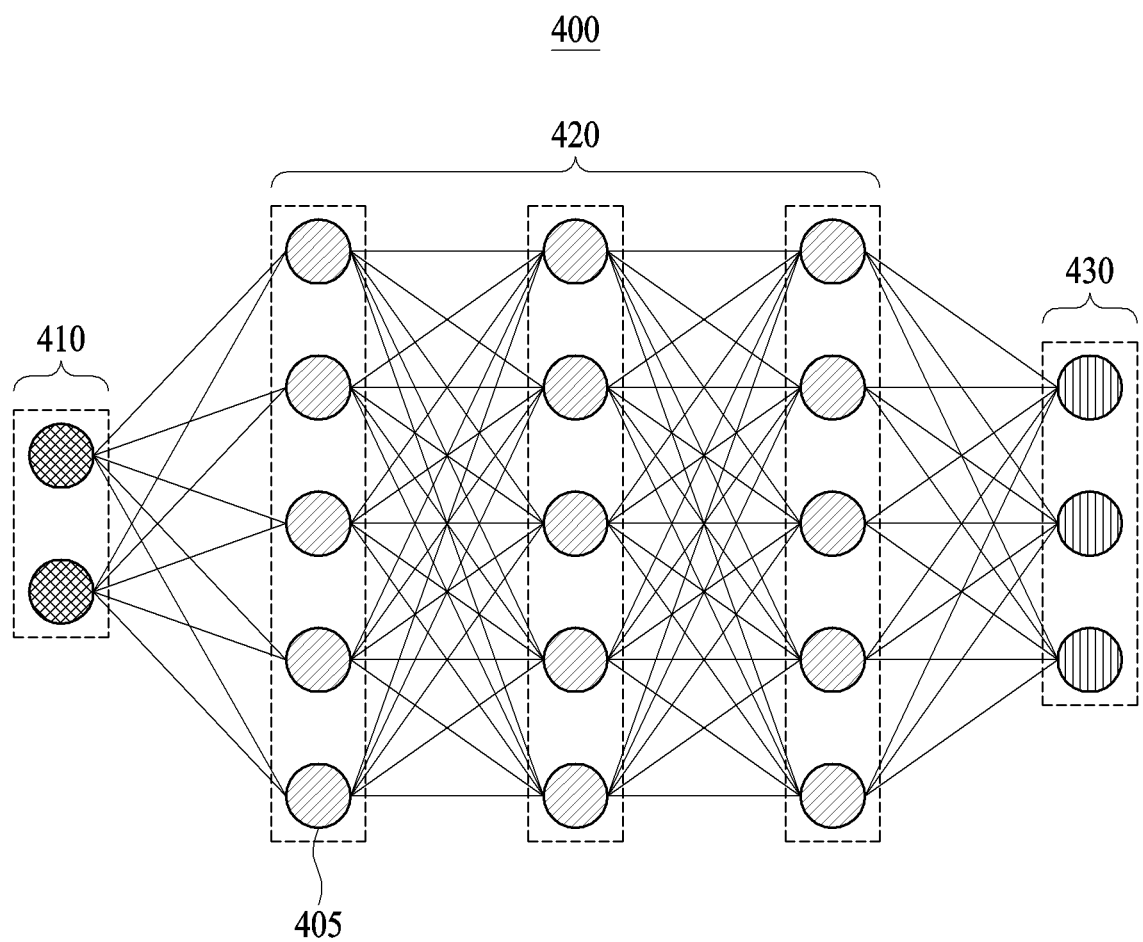
FIG. 4 illustrates an example structure of a first neural network and a second neural network, according to one or more embodiments.

FIG. 4 illustrates an example structure of a first neural network and a second neural network. Referring to FIG. 4, the first neural network and the second neural network may include, for example, a neural network 400.

The neural network 400 may be an example of a DNN. The DNN may include a fully connected network, a deep convolutional network, and a recurrent neural network, to name some examples. An electronic device may train at least one neural network and perform inference using the trained neural network.

The neural network 400 may perform various tasks by mapping input data and output data which are in a non-linear relationship based on deep learning. The neural network 400 may map input data and output data that are in a non-linear relationship through supervised or unsupervised machine learning. The unsupervised machine learning may include, for example, reinforcement learning through trial and error.

Referring to FIG. 4, the neural network 400 may include an input layer 410, one or more hidden layers 420, and an output layer 430. Each of the input layer 410, the hidden layer 420, and the output layer 430 may include a respective plurality of artificial nodes 405.

Although three hidden layer 420 are shown in FIG. 4, for ease of description, there may be other numbers of hidden layers 420. In addition, although the neural network 400 is illustrated in FIG. 4 as including a separate input layer 410 to receive input data, some input data may be input directly to a hidden layer 420 (bypassing the input layer 410). In the neural network 400, except for the output layer 430, the artificial nodes 405 of each layer may be connected to the artificial nodes 405 of the next layer through links for transmitting output signals. The number of links may correspond to a number of artificial nodes 405 included in the next layer.

To each artificial node included in a hidden layer 420, an output of an activation function related to weighted inputs of artificial nodes 405 included in a previous layer may be input. The weighted inputs may be obtained by multiplying a weight by inputs of artificial nodes included in a previous layer. The weight may also be referred to as a parameter of the neural network 400. The activation function may include, for example, a sigmoid function, a hyperbolic tangent (tan h) function, or a rectified linear unit (ReLU) function, but is not limited thereto. Nonlinearity may be provided in the neural network 400 by the activation function. To each of artificial nodes included in the output layer 430, weighted inputs of artificial nodes included in a previous layer may be input. When a width and a depth of the neural network 400 are sufficiently large, the neural network 400 may have a capacity to learn and implement an arbitrary function.

Although the neural network 400 has been described above as an example of a neural network, the neural network is not limited to the neural network 400 and may also be implemented in various other structures.

The above-described first neural network and second neural network may be configured as one neural network 400, or each of the first neural network and the second neural network may be configured as separate neural networks.

Figure 5A:
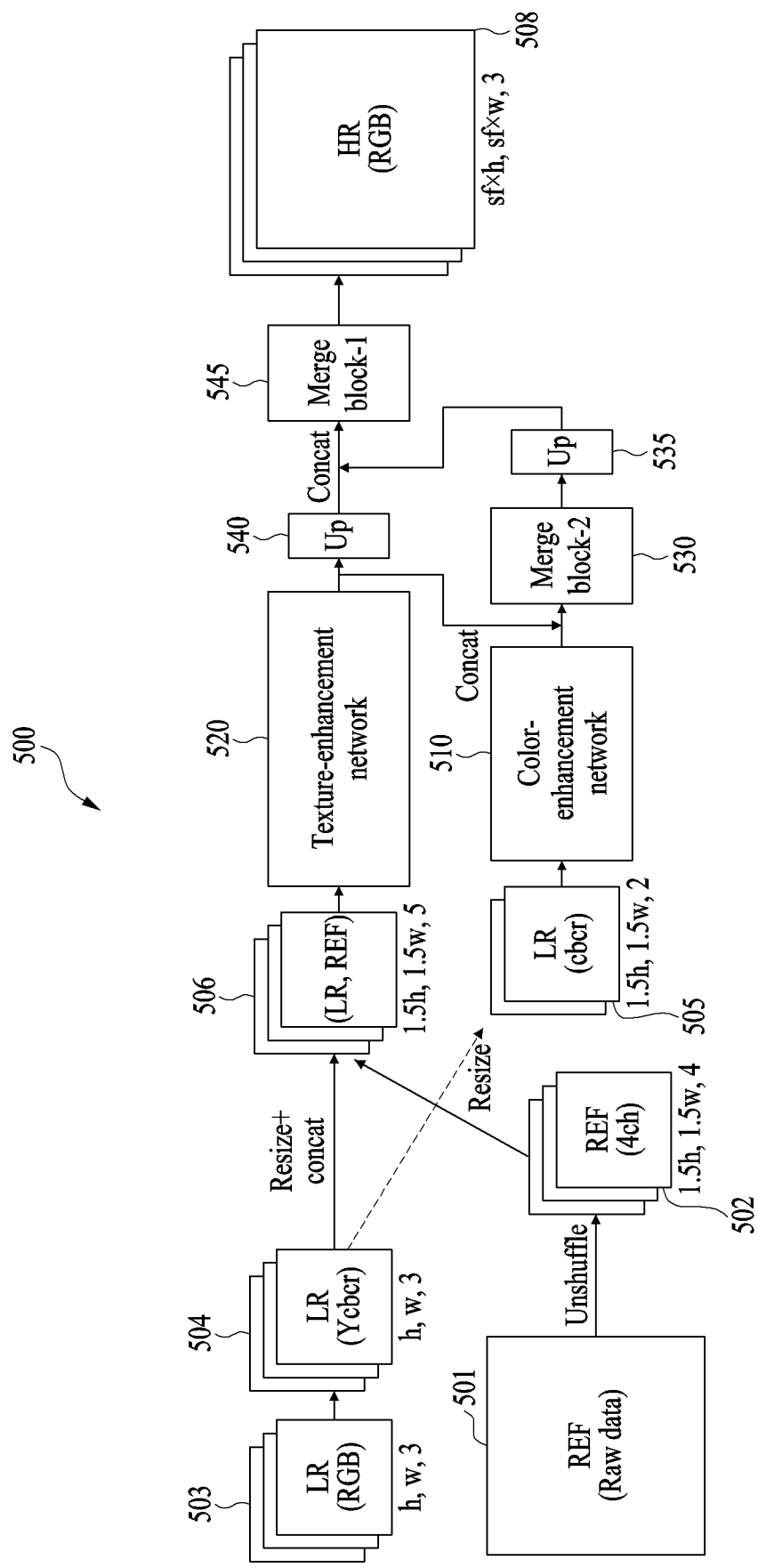
FIGS. 5A and 5B illustrate examples of a method of generating a high-resolution digital zoom image using a raw image with various possible patterns, according to one or more embodiments.
Figure 5B:
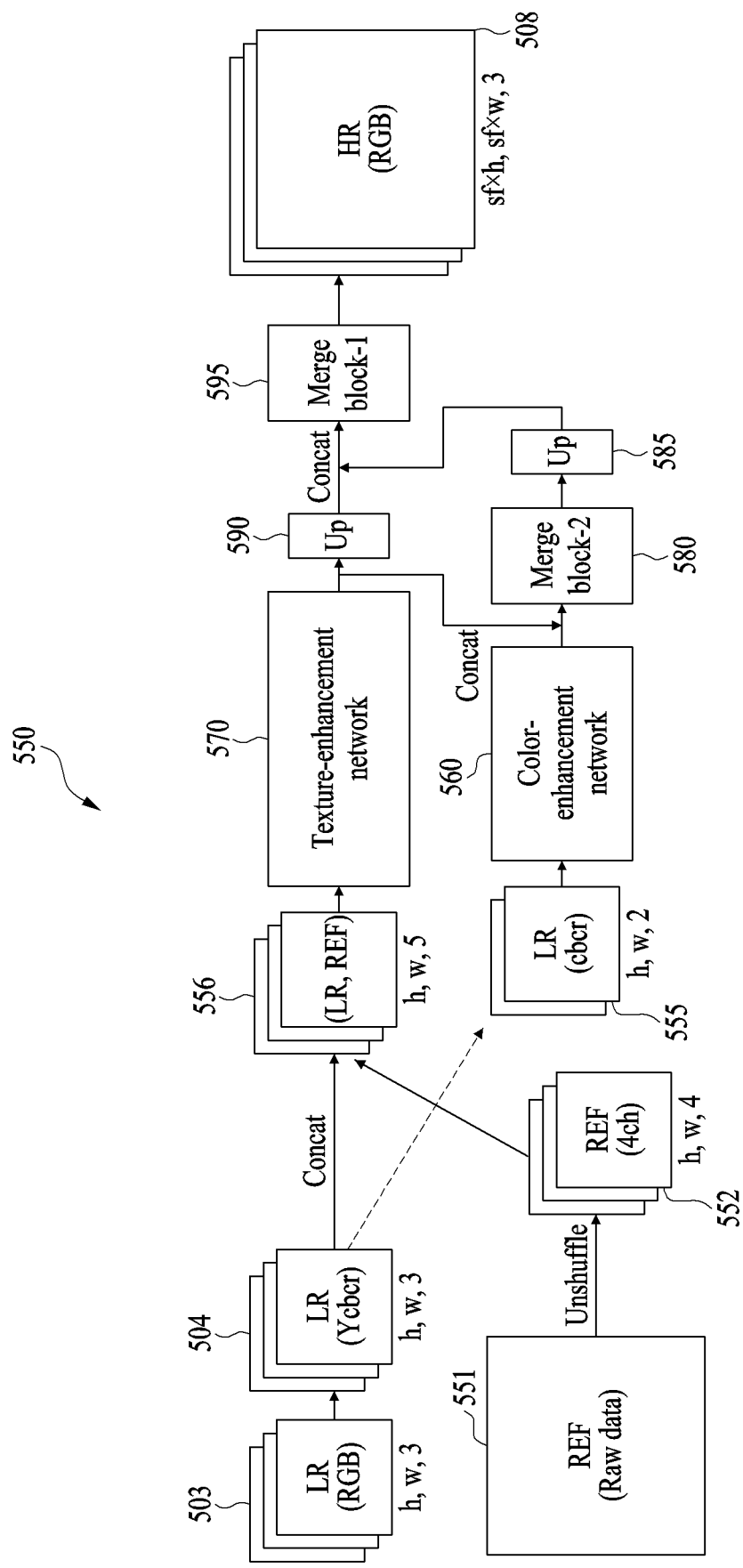

FIGS. 5A and 5B illustrate examples of a method of generating a high-resolution zoom image using a raw image with various possible patterns, according to one or more embodiments.

FIG. 5A illustrates an operation of an electronic device 500 for generating a high-resolution zoom image in an example in which an image sensor is a fine pixel sensor (e.g., a nona cell image sensor).

The electronic device 500 may perform 3×3 binning on data of the fine pixel sensor (e.g., a nona pixel) captured by a fine pixel camera, and may receive an RGB image 503 with a low resolution (LR) passing through an ISP pipeline. The RGB image 503 may have, for example, a resolution of 1 height h×1 width w×3 channels c. A format of raw data 501 used in FIG. 5A may be a nona cell, and one color filter sensor may be arranged in a 3×3 array. Accordingly, if the RGB image 503 has a resolution (size) of 1 height h×1 width w×3 channels c, the raw data 501 may have a resolution of 3 height h×3 width w×1 channel c. Hereinafter, the terms "resolution" and "size (of an image)" may be used interchangeably.

The electronic device 500 may convert the RGB image 503 to Ycbcr 504 (also with a low resolution (LR)), separate a chrominance component cbcr and a luminance component Y thereof, and input the separated components to a first neural network 510 and a second neural network 520. Here, the electronic device 500 may resize channel information 505 of the chrominance component cbcr from 1 height h×1 width w×3 channels c of Ycbcr 504 to 1.5 height h×1.5 width w×2 channel c. The electronic device 500 may generate a smaller image by reducing a resolution of the input RGB image 503 to be lower than the resolution of an image that would be generated by binning, and may pass the generated image through an ISP pipeline (e.g., an ISP pipeline 650 of FIG. 6); the reduced resolution may reduce ISP processing time. As described above, since most texture component information is in the raw data 501, even though an image generated by reducing the resolution of the RGB image 503 to be lower than the resolution of an image that would generated by binning, performance of the electronic device 500 to restore a texture may not significantly decrease. Since information of chrominance components is not greatly lost even though the resolution of the RGB image 503 is reduced, the electronic device 500 may restore color information by utilizing chrominance components of the RGB image 503 with the reduced resolution.

Here, the raw data 501 captured by the image sensor may be used as a reference image. The electronic device 500 may pass the raw data 501 through an unshuffle layer to perform reshaping that is, rearrange positions of the pixels, by four channels of green (G), red (R), blue (B), and green (G). For example, if the raw data 501 is reshaped for each color, G, R, B, G, size may be reduced by two times horizontally and vertically (i.e., halved), and reshaped raw data 502 may have a resolution of 1.5 height h×1.5 width×4 channels c.

In this example, since the resolution (e.g., 1.5 h×1.5 w) of the reshaped raw data 502 and the resolution (e.g., h×w) of Ycbcr 504 do not match, the electronic device 500 may change (e.g., resize or upscale) the resolution (e.g., h×w) of Ycbcr 504 by 1.5 times so that the resolution of Ycbcr 504 matches the resolution of the reshaped raw data 502.

As described above, according to the format of the raw data 501, the electronic device may, or may not, perform a process of resizing the resolution of Ycbcr 504 to be the same as the resolution of the reshaped raw data 502.

The electronic device 500 may generate a concatenated image 506 having a resolution of 1.5 height h×1.5 width w×5 channels c by concatenating (i) the reshaped raw data 502 (having resolution of 1.5 height h×1.5 width w×4 channels c) and (ii) channel information of the luminance component Y of the RGB image 503 which is resized. The electronic device 500 may input the concatenated image 506 to the second neural network 520. The second neural network 520 may be, for example, a texture-enhancement network or the texture enhancement block 150 described above with reference to FIG. 1.

The electronic device 500 may input the channel information 505 of the chrominance component cbcr of the RGB image 503 having the resolution of 1.5 height h×1.5 width w×2 channels c to the first neural network 510. Here, the channel information 505 of the chrominance component cbcr of the RGB image 503 may be a result of resizing the chrominance component cbcr (of Ycbcr 504) from the size of 1 height h×1 width w×3 channels c to the size of 1.5 height h×1.5 width w×2 channels c (indicated by the "Resize" dashed arrow in FIG. 5A). The first neural network 510 receiving the thus-resized channel information 505 may be, for example, a color-enhancement network or the color enhancement block 130 described above with reference to FIG. 1.

The electronic device 500 may fuse a second feature output from the second neural network 520 and a first feature output from the first neural network 510 in a merge block-2 530, and may upscale color information by passing fused information (a result of the fusing of the merge block-2 530) through an upscaling block 535.

The electronic device 500 may upscale texture information by passing the second feature output from the second neural network 520 through an upscaling block 540.

The electronic device 500 may fuse the upscaled color information and the upscaled texture information in a merge block-1 545 to generate an RGB image 508 that is zoomed with a high resolution. The RGB image 508 zoomed with the high resolution may have a resolution of sf×height h×sf×width w×3 channels c. Here, sf may correspond to a scaling factor.

FIG. 5B illustrates an operation of an electronic device 550 for generating a high-resolution zoom image in an example in which an image sensor is a fine pixel sensor (e.g., a tetra cell image sensor).

The electronic device 550 may perform 2×2 binning on data of the fine pixel sensor (e.g., a nona pixel) captured by a fine pixel camera, and may receive an RGB image 503 with a low resolution (LR) passing through an ISP pipeline (The output RGB image 508 may continue on to another stage of the ISP pipeline, for example). The RGB image 503 may have a resolution of 1 height h×1 width w×3 channels c.

The electronic device 550 may convert the RGB image 503 to Ycbcr 504 with a low resolution (LR), separate a chrominance component cbcr and a luminance component Y, and input the separated components to a first neural network 560 and a second neural network 570, respectively. Here, channel information 555 of the chrominance component cbcr may have a size of 1 height h×1 width w×2 channels c. In addition, channel information of a luminance component may have a size of 1 height h×1 width w×1 channel c.

Raw data 551 captured by the image sensor may be used as a reference image. The electronic device 550 may pass the raw data 551 through an unshuffle layer to perform reshaping that is, rearrange positions of the pixels, by four channels of green (G), red (R), blue (B), and green (G). Here, reshaped raw data 552 may have a size of 1 height h×1 width w×4 channels c.

The electronic device 550 may generate a concatenated image 556 having a resolution of 1.5 height h×1.5 width w×5 channels c by concatenating the reshaped raw data 552 with the size of 1 height h×1 width w×4 channels c and channel information of the luminance component Y of the RGB image 503 which is resized. The electronic device 550 may input the concatenated image 556 to the second neural network 570. The second neural network 570 may be, for example, a texture-enhancement network.

The electronic device 550 may input the channel information 555 of the chrominance component cbcr of the RGB image 503 (having the size of 1 height h×1 width w×3 channels c) to the first neural network 560. The first neural network 560 may be, for example, a color-enhancement network.

The electronic device 550 may fuse a second feature output from the second neural network 570 and a first feature output from the first neural network 560 in a merge block-2 580, and may upscale color information by passing fused information through an upscaling block 585.

The electronic device 550 may upscale texture information by passing the second feature output from the second neural network 570 through an upscaling block 590.

The electronic device 550 may fuse the upscaled color information and the upscaled texture information in a merge block-1 595 to generate an RGB image 508 that is zoomed with a high resolution. The RGB image 508 zoomed with the high resolution may have a size of sf×height h×sf×width w×3 channels c.

Figure 6:
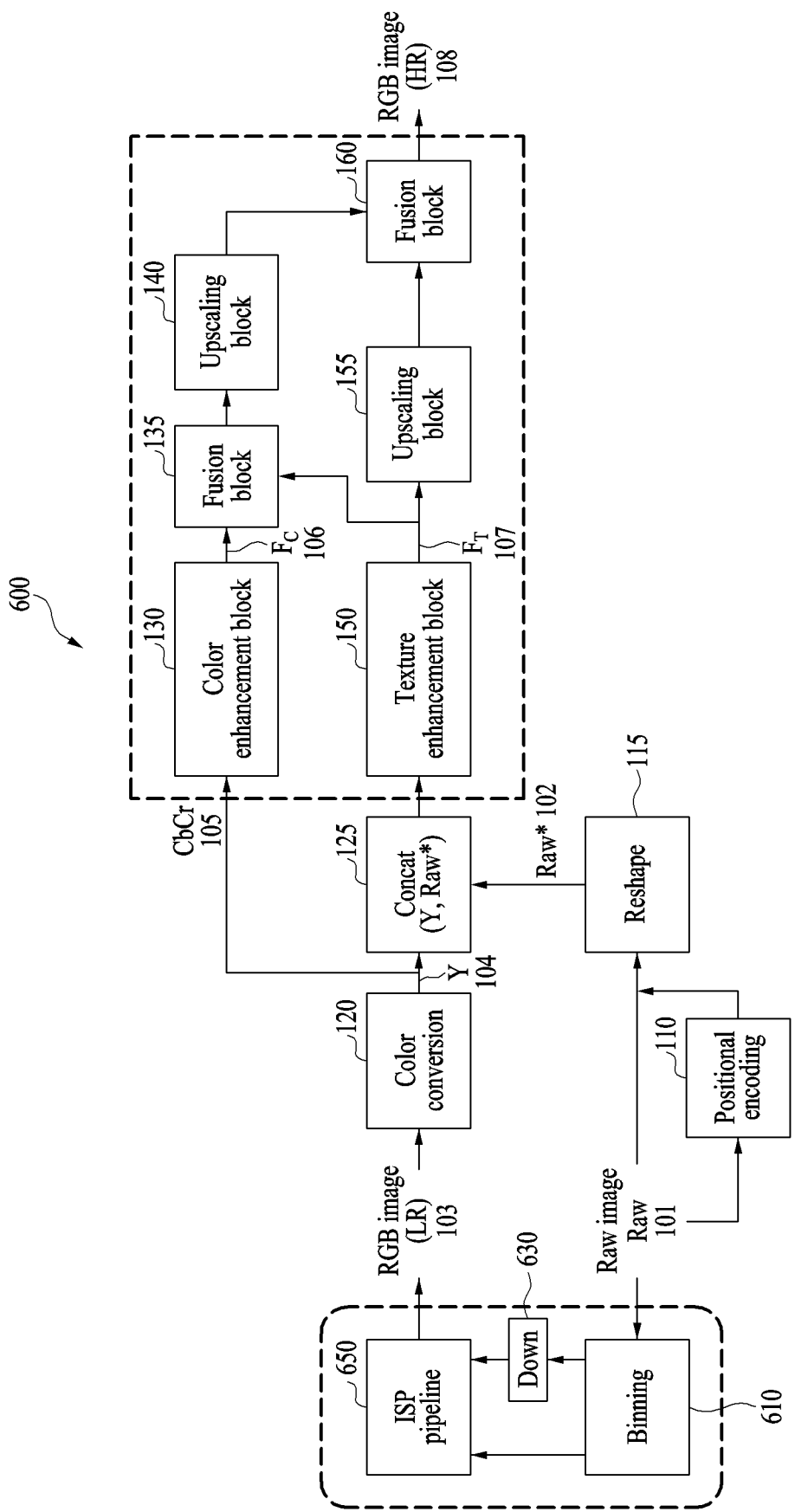
FIG. 6 illustrates an example of obtaining an RGB image, according to one or more embodiments.

FIG. 6 illustrates an example of obtaining an RGB image. Referring to FIG. 6, a diagram 600 illustrates a process of obtaining the RGB image 103 corresponding to the raw image 101 that is input to the electronic device 100. In the example of FIG. 6, the above-described plurality of components of the electronic device 100 are illustrated as separately configured components to describe functions thereof by distinguishing the functions from one another. Accordingly, when a device is implemented, the electronic device 100 may include all the plurality of components or process a portion of the components in at least one processor.

The electronic device 100 may include a binning block 610, a downsampling block 630, and the ISP pipeline 650.

The electronic device 100 may perform binning to reduce a size of image data, by generating one pixel from data of its neighboring pixels in the raw image 101, using the binning block 610. The electronic device 100 may perform binning using an average value of color information of neighboring pixels as a color value of one pixel, for example.

The electronic device 100 may downsample the raw image 101 (hereinafter, referred to as the binned raw image) as transformed through the binning, using the downsampling block 630. The electronic device 100 may generate a smaller RGB image through additional downsampling before ISP, to reduce an amount of computation in the ISP. The electronic device 100 may generate the RGB image 103 with the low resolution by performing ISP by passing a raw image (e.g., a binned raw image), which may be downsampled to various resolutions, through the ISP pipeline 650. The electronic device 100 may downsample the raw image to various resolutions, for example, as shown in FIG. 7 below.

The electronic device 100 may obtain a result having colors and/or textures that are further enhanced by performing fine tuning according to various resolutions.

In addition, the electronic device 100 may generate images of various resolutions by utilizing the raw image 101 to generate zoom images, to reduce a number of high-magnification optical cameras that are used in an encompassing device such as a mobile phone, a camera, etc.

Figure 7:
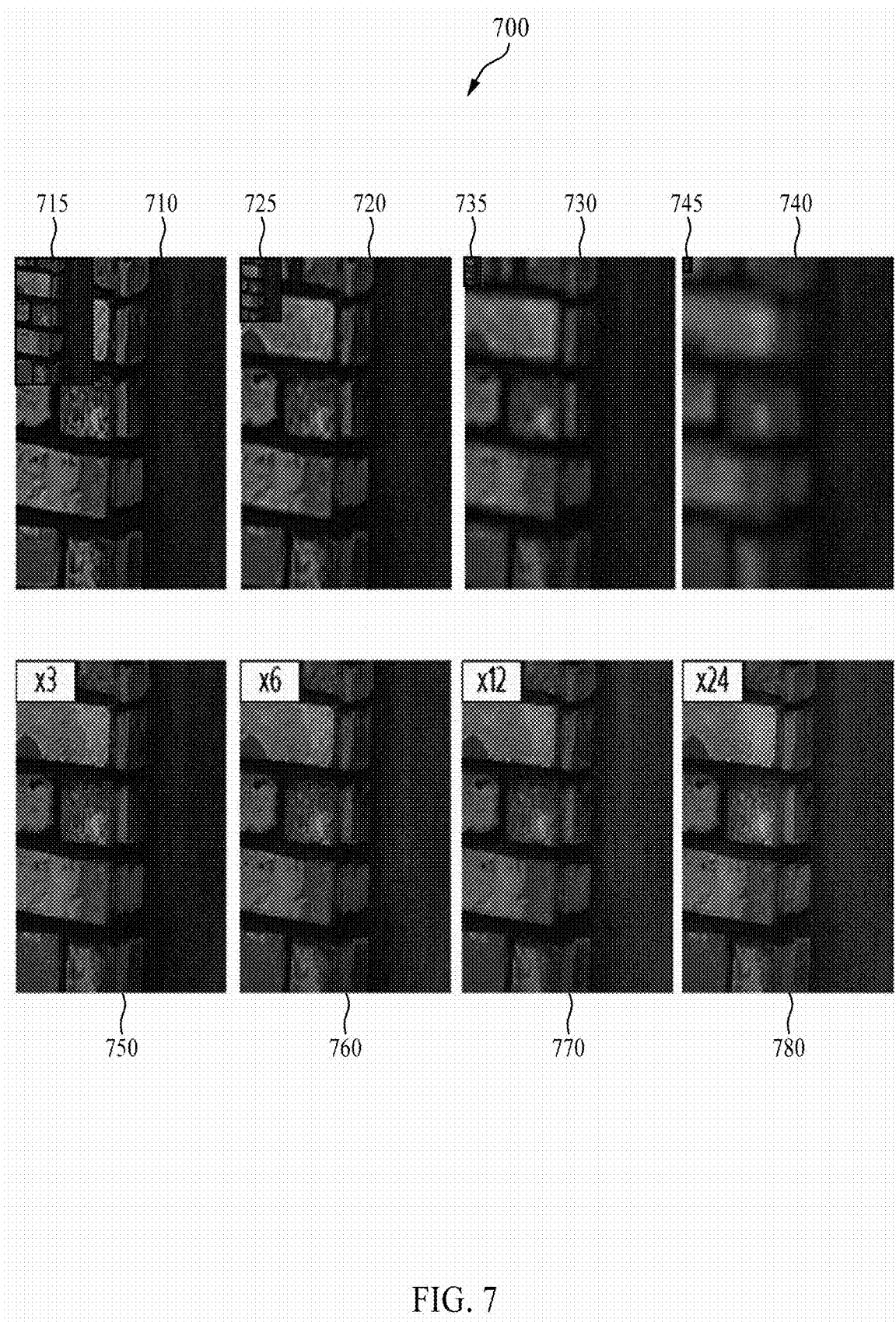
FIG. 7 illustrates example high-resolution digital zoom images generated using raw images downsampled to various resolutions, according to one or more embodiments.

FIG. 7 illustrates an example of high-resolution zoom images generated using raw images downsampled to various resolutions. Referring to FIG. 7, a diagram 700 illustrates RGB images 715, 725, 735, and 745 respectively generated by raw images 710, 720, 730, and 740 downsampled to various resolutions for an effect of reducing an amount of computation during ISP, and zoom images 750, 760, 770, and 780 respectively corresponding to the RGB images 715, 725, 735, and 745.

As described above, to reduce an amount of computation during ISP in an ISP pipeline, an electronic device may downsample the raw images 710, 720, 730, and 740 to various resolutions and generate the RGB images 715, 725, 735, and 745.

The RGB image 715 may correspond to the raw image 710 that is obtained by performing binning on a raw image.

The RGB image 725 may be an image generated by downsampling twice (2×) the raw image 720 (binning+2× down). The RGB image 735 may be an image generated by the image 730 obtained by downsampling four times (4×) the raw image. The RGB image 745 may be an image generated by the image 740 obtained by downsampling eight times (8×) the raw image.

The electronic device may generate the zoom images 750, 760, 770, and 780 zoomed-in to various sizes by applying the above-described methods of generating a high-resolution zoom image to the RGB images 715, 725, 735, and 745.

The electronic device may generate the zoom image 750 3× zoomed-in corresponding to the RGB image 715. The electronic device may generate the zoom image 760 6× zoomed-in corresponding to the RGB image 725. The electronic device may generate the zoom image 770 12× zoomed-in corresponding to the RGB image 735. The electronic device may generate the zoom image 760 24× zoomed-in corresponding to the RGB image 745.

The electronic device may generate smaller images (e.g., the RGB images 715, 725, 735, and 745) by reducing a resolution of an input RGB image to be lower than a resolution of the image 715 generated by binning, and may pass the images through the ISP pipeline, to reduce an ISP time. As described above, since information of chrominance components is not greatly lost even though the images (e.g., the RGB images 715, 725, 735, and 745) with resolutions reduced to be lower than the resolution of the image 715 generated by binning are used, the electronic device may generate the zoom images 750, 760, 770, and 780 with color information that is properly restored.

Figure 8:
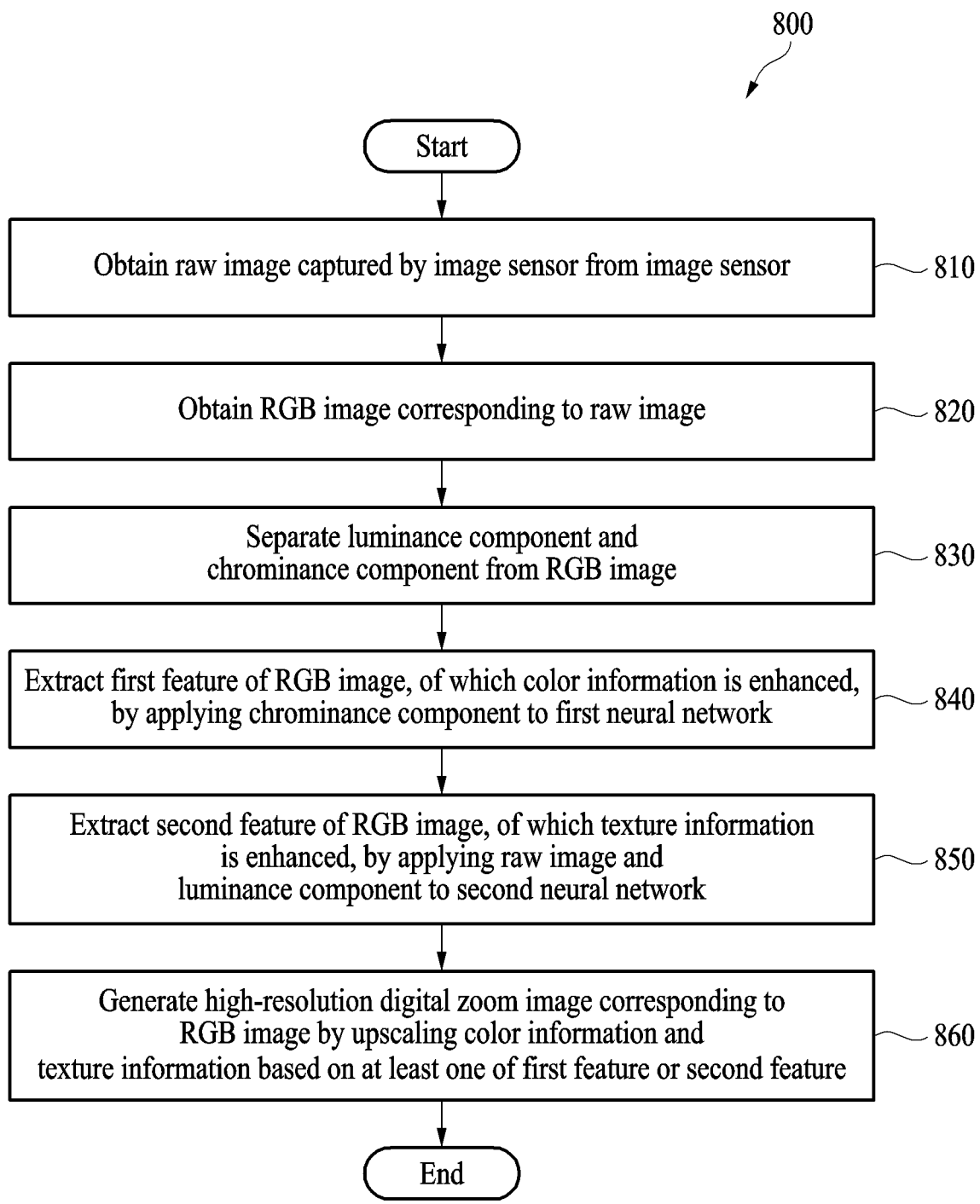
FIG. 8 illustrates an example method of generating a high-resolution digital zoom image, according to one or more embodiments.

FIG. 8 illustrates an example method of generating a high-resolution zoom image, according to one or more embodiments.

Referring to FIG. 8, a flowchart 800 illustrates a process in which an electronic device generates a high-resolution zoom image through operations 810 to 860.

In operation 810, the electronic device may obtain a raw image captured by an image sensor from the image sensor. The image sensor may include an ultra-fine pixel sensor, or an ultra-fine pixel camera having a fine pixel array. The image sensor may be, for example, an image sensor having a Bayer pattern, a tetra cell image sensor having a tetra cell pattern, or a nona cell image sensor having a nona cell pattern.

In operation 820, the electronic device may obtain an RGB image corresponding to the raw image obtained in operation 810. For example, the RGB image may be generated from the raw image directly by the electronic device or may be received from the outside of the electronic device. An example of generating an RGB image from a raw image by the electronic device is described with reference to FIG. 9 below.

In operation 830, the electronic device may separate a luminance component and a chrominance component from the RGB image obtained in operation 820.

In operation 840, the electronic device may extract a first feature of the RGB image of which color information is enhanced, and may do so by applying, to a first neural network, the chrominance component separated in operation 830.

In operation 850, the electronic device may extract a second feature of the RGB image of which texture information is enhanced, by applying, to a second neural network, the raw image obtained in operation 810 and the luminance component separated in operation 830. An example of extracting a second feature by the electronic device is described with reference to FIG. 10.

In operation 860, the electronic device may generate a high-resolution zoom image corresponding to the RGB image by upscaling the color information and the texture information based on at least one of the first feature extracted in operation 840 or the second feature extracted in operation 850. An example of generating a high-resolution zoom image by the electronic device is described with reference to FIG. 11.

Figure 9:
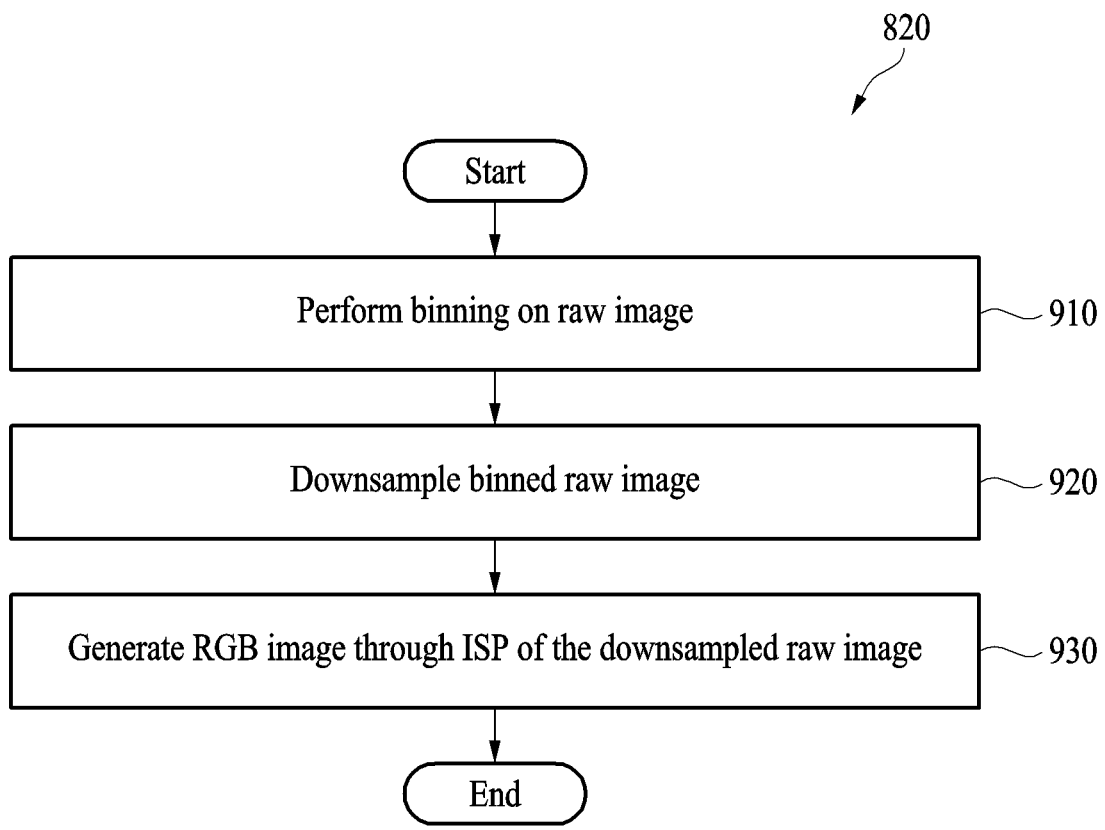
FIG. 9 illustrates an example of obtaining an RGB image, according to one or more embodiments.

FIG. 9 illustrates an example of obtaining the RGB image, according to one or more embodiments.

Referring to FIG. 9, the electronic device may generate an RGB image through operations 910 to 930.

In operation 910, the electronic device may perform binning on the raw image.

In operation 920, the electronic device may downsample the binned raw image (from the binning of operation 910).

In operation 930, the electronic device may generate an RGB image through ISP of the raw image downsampled in operation 920.

For example, the electronic device may perform binning on the raw image and perform ISP on the binned raw image, to generate an RGB image.

Figure 10:
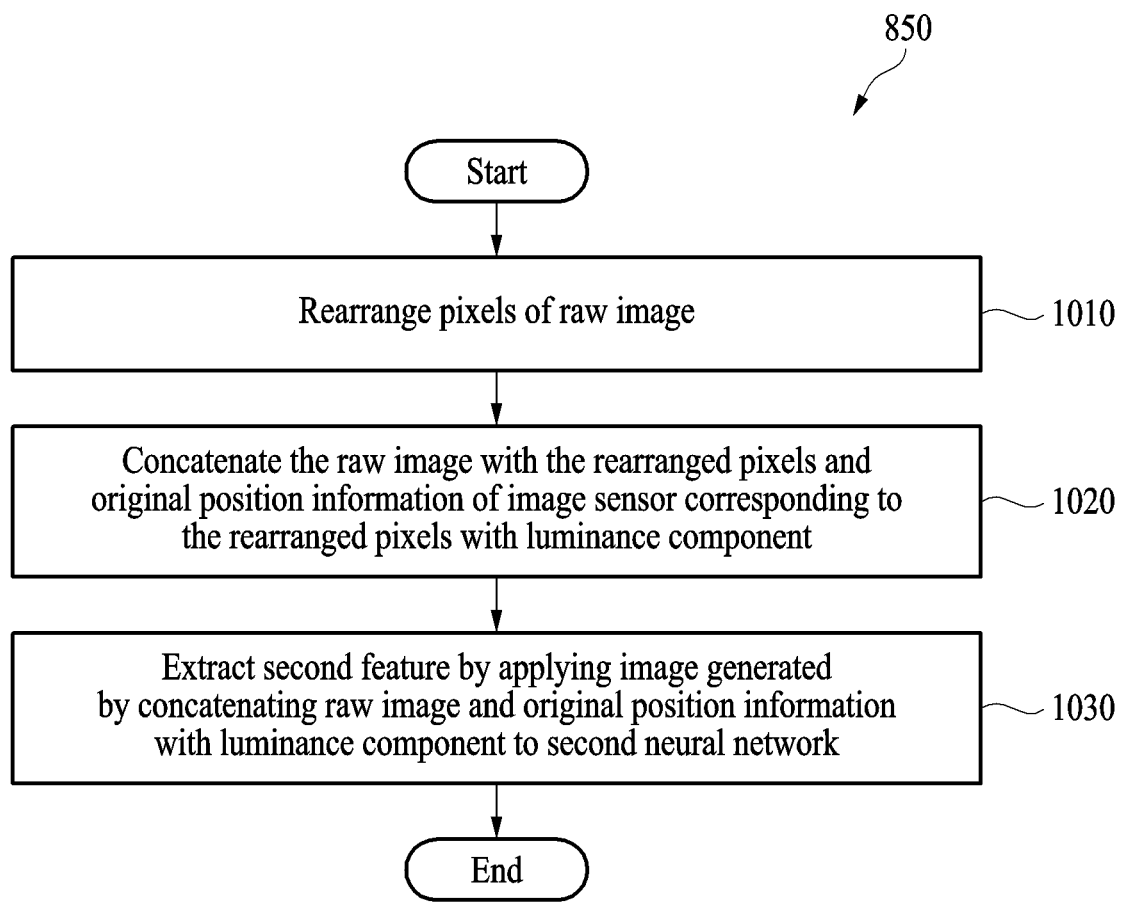
FIG. 10 illustrates an example of extracting a second feature, according to one or more embodiments.

FIG. 10 illustrates an example of extracting the second feature, according to one or more embodiments.

Referring to FIG. 10, the electronic device may obtain the second feature through operations 1010 to 1030.

In operation 1010, the electronic device may rearrange pixels of the raw image. The electronic device may rearrange the pixels of the raw image by four channels of green (G), red (R), blue (B), and green (G), based on encoded position information.

In operation 1020, the electronic device may concatenate the raw image with the pixels rearranged in operation 1010 and original position information of the image sensor corresponding to the rearranged pixels of the raw image with the luminance component. For example, the original position information of the image sensor may be obtained by concatenating x-axis position information of the image sensor and y-axis position information of the image sensor based on a predetermined rule, by generating a distance (or position) map by encoding the x-axis position information of the image sensor and the y-axis position information of the image sensor, or by applying the x-axis position information of the image sensor and the y-axis position information of the image sensor to a neural network. However, examples are not limited thereto. The electronic device may generate an image by concatenating the raw image (having the rearranged pixels) and the original position information of the image sensor corresponding to the rearranged pixels of the raw image with the luminance component.

In operation 1030, the electronic device may extract the second feature by applying an image generated by concatenating, to the second neural network, the raw image and the original position information with the luminance component in operation 1020.

Figure 11:
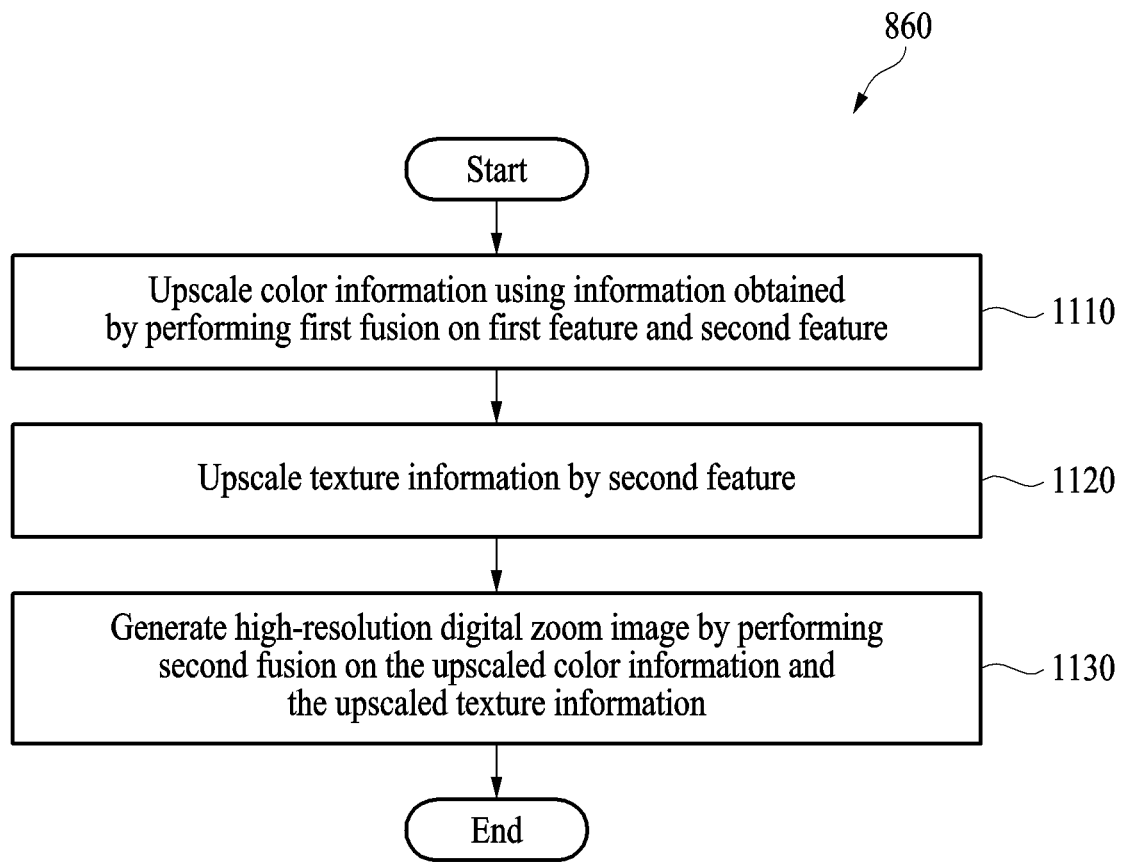
FIG. 11 illustrates an example of generating a high-resolution digital zoom image corresponding to an RGB image, according to one or more embodiments.

FIG. 11 illustrates an example of generating a high-resolution zoom image corresponding to an RGB image, according to one or more embodiments.

Referring to FIG. 11, the electronic device may generate a high-resolution zoom image through operations 1110 to 1130.

In operation 1110, the electronic device may upscale the color information using information obtained by performing a first fusion on the first feature extracted in operation 840 and the second feature extracted in operation 850.

In operation 1120, the electronic device may upscale the texture information by the second feature extracted in operation 850.

In operation 1130, the electronic device may generate the high-resolution zoom image by performing a second fusion on the color information upscaled in operation 1110 and the texture information upscaled in operation 1120.

Figure 12:
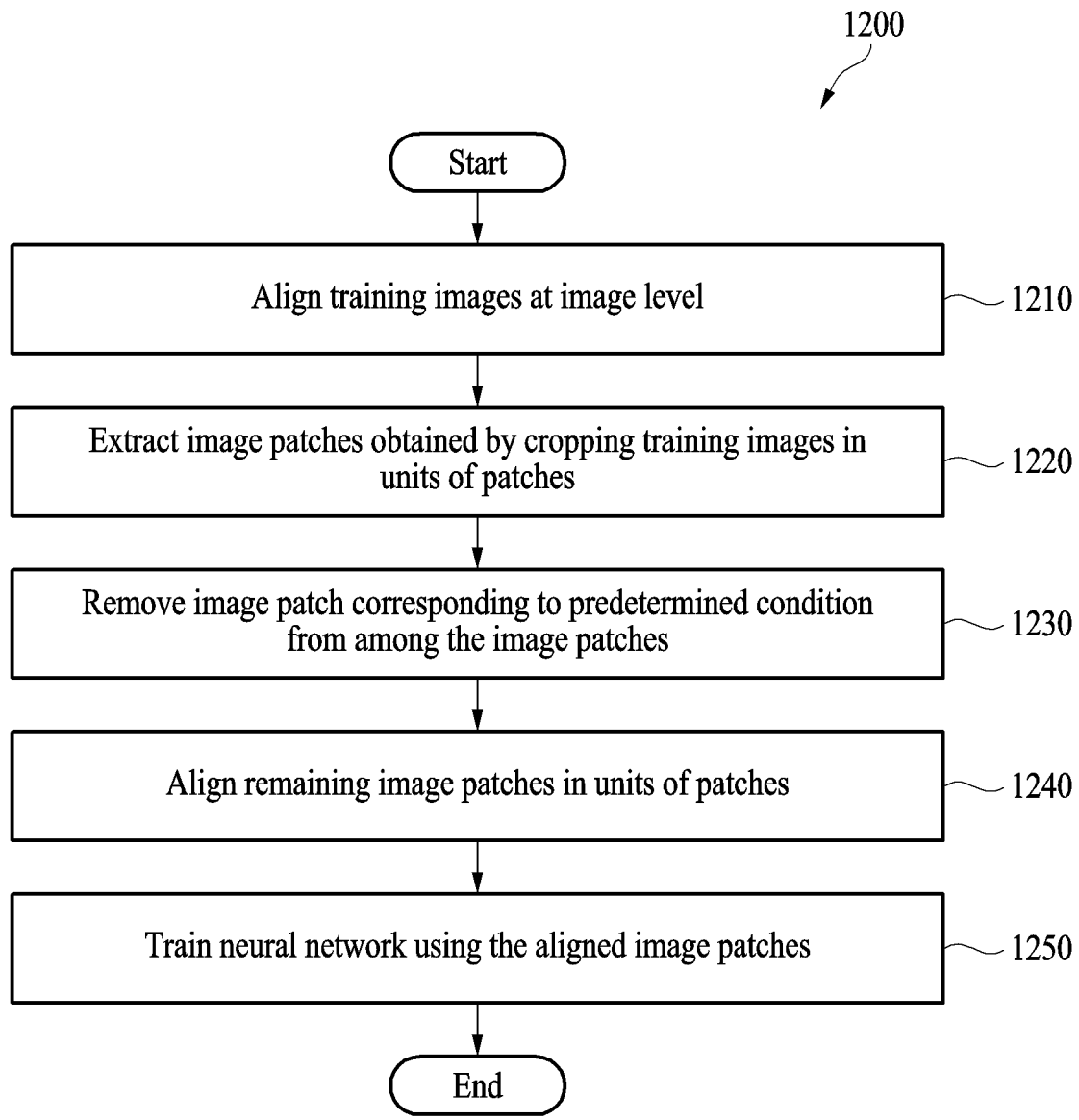
FIG. 12 illustrates an example of generating training data for a neural network, according to one or more embodiments.

FIG. 12 illustrates an example of generating training data for a neural network, according to one or more embodiments.

Referring to FIG. 12, a flowchart 1200 illustrates a process in which an electronic device trains a neural network through operations 1210 to 1250.

In operation 1210, the electronic device may align training images at an image level. The training images may correspond to images actually captured using an optical camera. The training images may correspond to, for example, a pair of images captured by a 1× fine pixel camera (e.g., a wide camera) and a high-magnification optical camera (e.g., a tele camera). Here, since the 1× fine pixel camera and the high-magnification optical camera are incorrectly aligned, texture misalignment may occur. The electronic device may primarily perform pre-training by a loss focusing on restoration of a texture and color in response to correct alignment in a synthetic environment, and may secondarily perform training using loss(es) that is/are insensitive to texture misalignment based on refined real data that meets a predetermined condition.

To eliminate (or reduce) the texture misalignment, the electronic device may train the neural network using training data refined through the following operations.

In operation 1220, the electronic device may extract image patches obtained by cropping the training images aligned in operation 1210 in units of patches.

In operation 1230, the electronic device may remove an image patch corresponding to a predetermined condition from among the image patches extracted in operation 1220. Here, image patches corresponding to a predetermined condition may be, for example, homogeneous image patches and/or image patches having different white balances, but are not limited thereto. Since the homogeneous image patches with little variation and/or image patches with different white balances are not properly trained (e.g., may not be beneficial to training), the electronic device may enhance a training efficiency by removing the homogeneous image patches and/or the image patches with different white balances.

In an example, when an image patch has an edge rate less than an edge threshold, the electronic device may determine that the image patch corresponds to a homogeneous image patch. In another example, when an image patch has a color lab error greater than a color lab error threshold, and/or has a color angular error greater than a color angular error threshold, the electronic device may determine that white balances of image patches are different from each other.

In operation 1240, the electronic device may align image patches remaining after the image patch corresponding to the predetermined condition is removed in operation 1230 in units of patches. The electronic device may align image patches in units of patches by, for example, an affine transformation. The electronic device may store the image patches aligned in operation 1240 in a training database and use the image patches to train the neural network.

In operation 1250, the electronic device may train the neural network using the image patches aligned in units of patches in operation 1240.

For example, when an image captured by a 1× fine pixel camera (wide camera) is input, the electronic device may train the neural network to output a result image that is identical to an image captured by a high-magnification optical camera (tele camera). In this example, since the 1× fine pixel camera (wide camera) and the high-magnification optical camera (tele camera) are incorrectly aligned, texture misalignment may occur. The electronic device may train the neural network by a loss that is based on the texture misalignment. Here, the "loss based on the texture misalignment" may be a loss that is insensitive to texture misalignment, which may include, for example, a DISTS loss based on an image quality perceived by humans, a CoBi loss, and the like, but is not limited thereto. The DISTS loss is based on a difference in an image quality between two images perceived by humans. The CoBi loss involves a comparison between pixels and may be based on a difference between a most similar pixel value within a predetermined patch area and a corresponding patch image.

Figure 13:
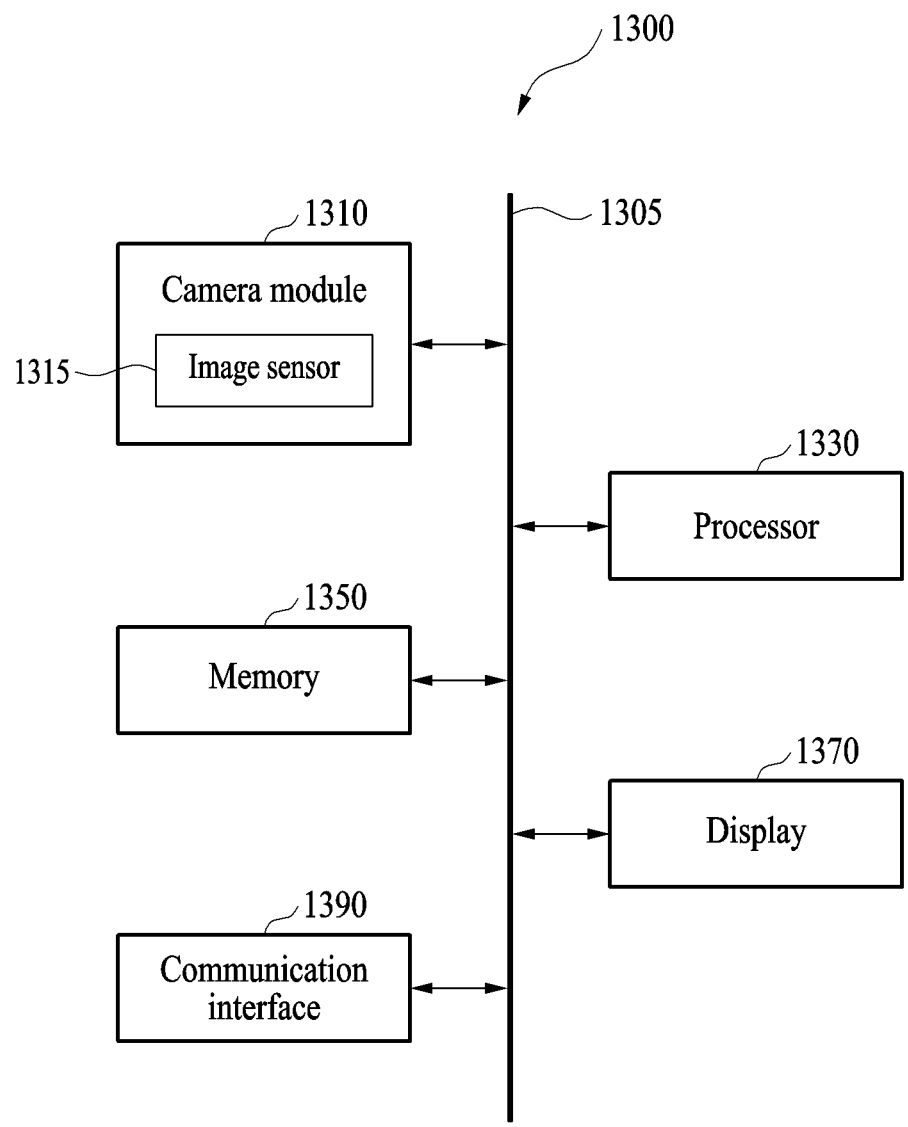
FIG. 13 illustrates an example of an electronic device for generating a high-resolution digital zoom image, according to one or more embodiments.

FIG. 13 illustrates an example of an electronic device for generating a high-resolution zoom image, according to one or more embodiments. Referring to FIG. 13, an electronic device 1300 may include a camera module 1310, a processor 1330, a memory 1350, a display 1370, and a communication interface 1390. The camera module 1310, the processor 1330, the memory 1350, the display 1370, and the communication interface 1390 may communicate with each other via a communication bus 1305.

The electronic device 1300 may be any of various image capturing devices, for example, a smartphone, a camera, a medical imaging device, and semiconductor measuring equipment, however, examples are not limited thereto.

The camera module 1310 may include an image sensor 1315. The image sensor 1315 may capture a raw image. The image sensor 1315 may be, for example, a single image sensor or a plurality of image sensors. The image sensor 1315 may include, for example, an ultra-fine pixel sensor, or an ultra-fine pixel camera having a fine pixel array. The camera module 1310 may further include a 1× high-magnification optical camera, and/or a 3× high-magnification optical camera.

The processor 1330 may obtain the raw image from the image sensor 1315. The processor 1330 may obtain an RGB image corresponding to the raw image. The RGB image may be obtained through ISP in the camera module 1310 or the processor 1330. The processor 1330 may separate a luminance component and a chrominance component from the RGB image. The processor 1330 may extract a first feature of the RGB image with enhanced color information, by applying the chrominance component to a first neural network. The processor 1330 may extract a second feature of the RGB image with enhanced texture information, by applying the luminance component to a second neural network. The processor 1330 may generate a high-resolution zoom image corresponding to the RGB image by upscaling the color information and texture information based on at least one of the first feature or the second feature.

The memory 1350 may store the high-resolution zoom image generated by the processor 1330. The memory 1350 may also store at least one program and/or a variety of information generated in a processing process of the processor 1330. In addition, the memory 1350 may store a variety of data and programs. The memory 1350 may include, for example, a volatile memory or a non-volatile memory. The memory 1350 may include a high-capacity storage medium such as a hard disk to store a variety of data.

The display 1370 may display the high-resolution zoom image generated by the processor 1330.

The communication interface 1390 may transmit the high-resolution zoom image generated by the processor 1330 to the outside of the electronic device 1300. In addition, the communication interface 1390 may receive a raw image from the outside of the electronic device 1300 or an RGB image corresponding to the raw image.

In addition, the processor 1330 may perform the at least one method described above with reference to FIGS. 1 to 12 or an algorithm corresponding to the at least one method. The processor 1330 may execute a program and control the electronic device 1300. Code of the program executed by the processor 1330 may be stored in the memory 1350.

The processor 1330 may be a hardware-implemented electronic device having a physically structured circuit to execute desired operations. The desired operations may include, for example, codes or instructions included in a program. The hardware-implemented electronic device 1300 may include, for example, a microprocessor, a s central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The electronic device 1300 may be connected to an external device (e.g., a personal computer (PC) or a network) through an input/output device (not shown) to exchange data therewith. The electronic device 1300 may be installed in various computing apparatuses and/or systems.

The computing apparatuses, the electronic devices, the processors, the memories, the image sensors, the displays, the information output system and hardware, the storage devices, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of generating a zoom image, the method comprising:
    obtaining a raw image captured by an image sensor;
    obtaining an RGB image corresponding to the raw image;
    separating a luminance component and a chrominance component from the obtained RGB image;
    extracting a first feature of the obtained RGB image, of which color information is enhanced, by applying the chrominance component to a first neural network;
    extracting a second feature of the obtained RGB image, of which texture information is enhanced, by applying the raw image and the luminance component to a second neural network; and
    generating the zoom image, which corresponds to the obtained RGB image, by upscaling the color information and the texture information based on the first feature or the second feature.

2. The method of claim 1, wherein the extracting of the second feature comprises:
    rearranging pixels of the raw image;
    concatenating the raw image having the rearranged pixels and original position information of the image sensor, which corresponds to the rearranged pixels of the raw image, with the luminance component; and
    extracting the second feature by applying, to the second neural network, an image obtained by concatenating the raw image and the original position information with the luminance component.

3. The method of claim 2, wherein the original position information of the image sensor is obtained by concatenating x-axis position information of the image sensor and y-axis position information of the image sensor.

4. The method of claim 2, wherein the original position information of the image sensor is obtained by generating a position map by encoding x-axis position information of the image sensor and y-axis position information of the image sensor.

5. The method of claim 2, wherein the original position information of the image sensor is obtained by applying x-axis position information of the image sensor and y-axis position information of the image sensor to a neural network.

6. The method of claim 2, wherein the rearranging of the pixels of the raw image comprises rearranging the pixels of the raw image by four channels of green (G), red (R), blue (B), and green (G).

7. The method of claim 1, wherein the obtaining of the RGB image comprises:
    performing binning on the raw image; and
    generating the RGB image through an image signal processing (ISP) of the raw image on which the binning has been performed.

8. The method of claim 1, wherein the obtaining of the RGB image comprises:
    performing binning on the raw image;
    downsampling the raw image on which the binning has been performed; and
    generating the RGB image through ISP of the downsampled raw image.

9. The method of claim 1, wherein the generating of the zoom image comprises:
    upscaling the color information using information obtained by performing a first fusion on the first feature and the second feature;
    upscaling the texture information according to the second feature; and
    generating the zoom image by performing a second fusion on the upscaled color information and the upscaled texture information.

10. The method of claim 1, wherein the raw image has a Bayer pattern, a tetra cell pattern, or a nona cell pattern.

11. The method of claim 10, further comprising:
    in response to the raw image having the tetra cell pattern or the nona cell pattern, converting the raw image into the Bayer pattern by rearranging color filters of the raw image on a pixel-by-pixel basis.

12. The method of claim 1, wherein the image sensor comprises an ultra-fine pixel sensor, or an ultra-fine pixel camera having a fine pixel array.

13. A non-transitory computer-readable storage medium storing instructions that, when executed by a processor, cause the processor to perform the method of claim 1.

14. An electronic device comprising:
    an image sensor configured to capture a raw image;
    one or more processors; and
    a memory comprising one or more non-transitory storage media that store instructions that, when executed by the one or more processors, configures the one or more processors to:

obtain the raw image from the image sensor;
obtain an RGB image corresponding to the raw image;
separate a luminance component and a chrominance component from the obtained RGB image;
extract a first feature of the obtained RGB image, of which color information is enhanced, by applying the chrominance component to a first neural network;
extract a second feature of the obtained RGB image, of which texture information is enhanced, by applying the raw image and the luminance component to a second neural network; and
generate a zoom image corresponding to the obtained RGB image by upscaling the color information and the texture information based on the first feature or the second feature.

15. The electronic device of claim 14, wherein, for the extracting of the second feature, the execution of the instructions further configures the one or more processors to:
rearrange pixels of the raw image;
concatenate the (i) raw image having the rearranged pixels and original position information of the image sensor corresponding to the rearranged pixels of the raw image with (ii) the luminance component; and
extract the second feature by applying, to the second neural network, an image obtained by concatenating the raw image and the original position information with the luminance component to the second neural network.

16. The electronic device of claim 15, wherein, for an obtainment of the original position information of the image sensor, the execution of the instructions further configures the one or more processors to:
concatenate x-axis position information of the image sensor and y-axis position information of the image sensor;
generate a position map by encoding the x-axis position information of the image sensor and the y-axis position information of the image sensor; or
apply the x-axis position information of the image sensor and the y-axis position information of the image sensor to a neural network.

17. The electronic device of claim 15, wherein the execution of the instructions further configures the one or more processors to rearrange the pixels of the raw image by four channels of green (G), red (R), blue (B), and green (G).

18. The electronic device of claim 14, wherein the execution of the instructions further configures the one or more processors to:
perform binning on the raw image;
downsample the raw image on which the binning has been performed; and
generate the RGB image through image signal processing (ISP) of the downsampled raw image.

19. The electronic device of claim 14, wherein the execution of the instructions further configures the one or more processors to:
upscale the color information using information obtained by performing a first fusion on the first feature and the second feature;
upscale the texture information by the second feature; and
generate the zoom image by performing a second fusion on the upscaled color information and the upscaled texture information.

20. The electronic device of claim 14, further comprising:
a display configured to display the zoom image; or
another memory, or the memory, configured to store the zoom image.

* * * * *